(12) United States Patent
Li et al.

(10) Patent No.: US 10,623,152 B2
(45) Date of Patent: Apr. 14, 2020

(54) METHOD AND DEVICE FOR MULTI-USER MULTIPLEXING TRANSMISSION

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/746,324

(22) PCT Filed: Jul. 4, 2016

(86) PCT No.: PCT/KR2016/007177
§ 371 (c)(1),
(2) Date: Jan. 19, 2018

(87) PCT Pub. No.: WO2017/014445
PCT Pub. Date: Jan. 26, 2017

(65) Prior Publication Data
US 2018/0205511 A1 Jul. 19, 2018

(30) Foreign Application Priority Data
Jul. 20, 2015 (CN) .......................... 2015 1 0427865

(51) Int. Cl.
*H04L 5/00* (2006.01)
*H04L 1/00* (2006.01)
*H04L 1/18* (2006.01)

(52) U.S. Cl.
CPC .......... *H04L 5/0026* (2013.01); *H04L 1/0009* (2013.01); *H04L 1/0025* (2013.01);
(Continued)

(58) Field of Classification Search
CPC ... H04L 1/0009; H04L 1/0003; H04L 1/0025; H04L 1/0031; H04L 1/1812;
(Continued)

(56) References Cited

U.S. PATENT DOCUMENTS 5,239,557 A * 8/1993 Dent .................. H04B 1/70755
370/342
2014/0293890 A1* 10/2014 Davydov .............. H04L 5/0085
370/329
(Continued)

FOREIGN PATENT DOCUMENTS

GB      2508871 A  *  6/2014  ............ H04W 12/08
JP      201541941        3/2015

OTHER PUBLICATIONS

Evaluation methodologies for downlink multiuser superposition transmissions NTT Docomo R1-152063 3GPP TSG RAN WG1 meeting (Year: 2015).*
(Continued)

*Primary Examiner* — Rina C Pancholi
(74) *Attorney, Agent, or Firm* — The Farrell Law Firm, P.C.

(57) ABSTRACT

The present application discloses a method for multi-user multiplexing transmission, for decoding data of a plurality of user equipments (UEs) multiplexed by power domain, comprising: acquiring control information for decoding an interfering UE; decoding received data according to said control information to obtain data of the interfering UE, coding said data to restore a signal of the interfering UE, and deleting the signal of the interfering UE from the received data; and decoding the received data from which the signal of the interfering UE has been deleted, to obtain data of a target UE. The present application further discloses a device for multi-user multiplexing transmission. With the present
(Continued)

According to the operation state of a UE, configuring an MCS set of the UE by a high-layer signaling, or predefining an MCS set — 301

Indicating the MCS of the UE in the DCI — 302 application, the multi-user multiplexing based on power domain can be effectively supported.

20 Claims, 2 Drawing Sheets

(52) U.S. Cl.
CPC .......... *H04L 1/1812* (2013.01); *H04L 5/0091* (2013.01); *H04L 1/0003* (2013.01); *H04L 1/0031* (2013.01); *H04L 1/1896* (2013.01); *H04L 5/0048* (2013.01); *H04L 5/0055* (2013.01)

(58) Field of Classification Search
CPC ... H04L 1/1896; H04L 5/0026; H04L 5/0091; H04L 5/0048; H04L 5/0055
See application file for complete search history.

(56) References Cited

U.S. PATENT DOCUMENTS

| | | | | |
|---|---|---|---|---|
| 2014/0362769 | A1* | 12/2014 | Chen | H04J 11/0053 370/328 |
| 2015/0382327 | A1* | 12/2015 | Kishiyama | H04J 11/004 11/4 |
| 2016/0205695 | A1* | 7/2016 | Kishiyama | H04W 72/082 370/315 |

OTHER PUBLICATIONS

PCT/ISA/210 Search Report issued on PCT/KR2016/007177 (pp. 3).
PCT/ISA/237 Written Opinion issued on PCT/KR2016/007177 (pp. 7).
3GPP TSG RAN WG1 Meeting #80bis, Belgrade, Serbia, Apr. 20-24, 2015, NTT DOCOMO, Evaluation methodologies for downlink multiuser superposition transmissions, pp. 8.
3GPP Tsg Ran WG1 Meeting #81, Fukuoka, Japan, May 25-29, 2015, Institute for Information Industry (III), Discussion on Joint-QAM Modulation for Superposition Scheme, pp. 6.
3GPP TSG RAN WG1 Meeting #81, Fukuoka, Japan, May 25-29, 2015, Intel Corporation, Discussion on downlink multiuser superposition schemes, pp. 5.
3GPP TSG RAN WG1 Meeting #81, Fukuoka, Japan, May 25-29, 2015, Alcatel-Lucent Shanghai Bell, Alcatel-Lucent, Overview of Downlink multiuser superposition schemes, pp. 6.

* cited by examiner

[Fig. 1]
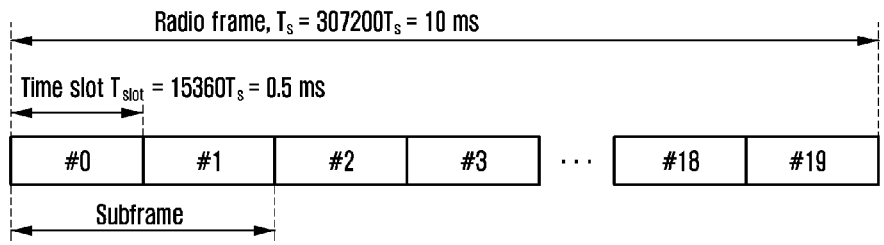
[Fig. 2]
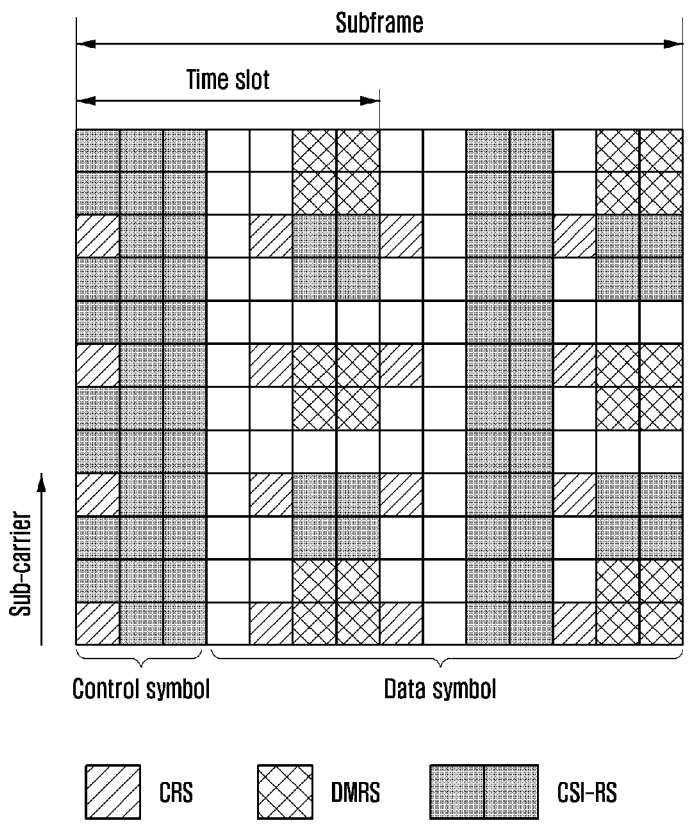
[Fig. 3]
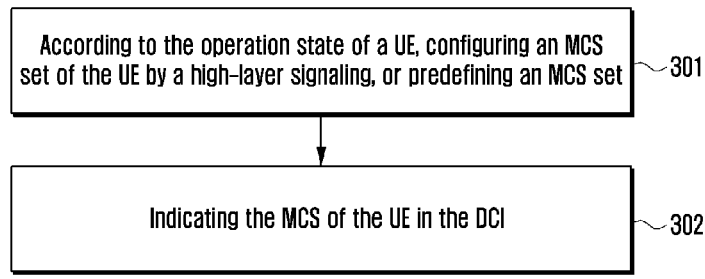

[Fig. 4]
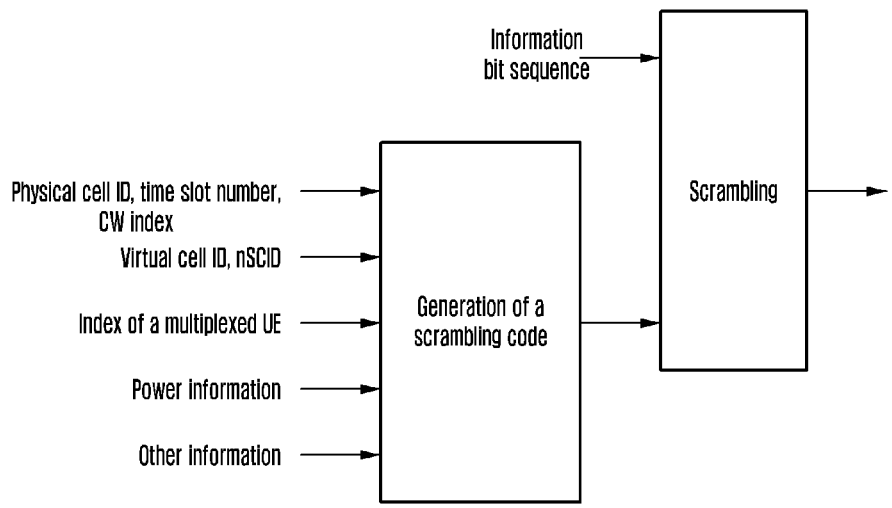
[Fig. 5]
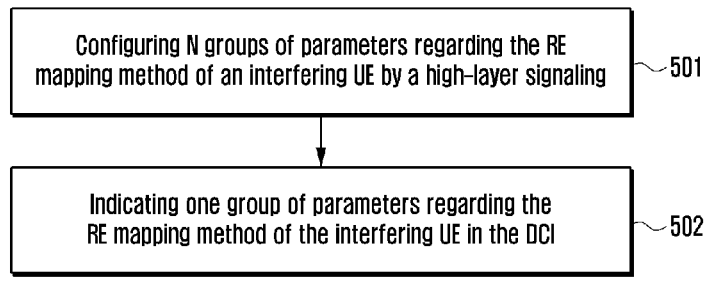
[Fig. 6]
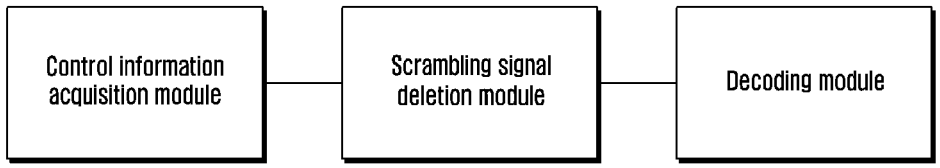

US 10,623,152 B2

METHOD AND DEVICE FOR MULTI-USER MULTIPLEXING TRANSMISSION

PRIORITY

This application is a National Phase Entry of PCT International Application No. PCT/KR2016/007177 which was filed on Jul. 4, 2016, and claims priority to Chinese Patent Application No. 201510427865.0, which was filed on Jul. 20, 2015, the content of each of which is incorporated herein by reference.

TECHNICAL FIELD

The present invention relates to wireless communication systems, and in particular to a method and device for transmission by multiplexing data of a plurality of users by power domain.

BACKGROUND ART

In a long term evolution (LTE) system in the 3GPP standardization organization, each radio frame is 10 ms in length and equally divided into ten subframes. As shown in FIG. 1, taking an FDD system as an example, each radio frame is 10 ms in length and contains ten subframes each of which is 1 ms in length. Each subframe consists of two successive time slots each of which is 0.5 ms in length. That is, the kth subframe contains a time slot 2k and a time slot 2k+1, k=0, 1, . . . , 9. One downlink transmission time interval (TTI) is defined on one subframe.

FIG. 2 shows the structure of a downlink subframe in an LTE system. In this structure, the first n OFDM symbols (n is 1, 2 or 3) form a downlink control channel region, and are used for transmitting user downlink control information, including a physical control format indication channel (PCFICH), a physical HARQ indication channel (PHICH), and a physical downlink control channel (PDCCH); and the remaining OFDM symbols are used for transmitting a physical downlink shared channel (PDSCH) and an enhanced PDCCH (EPDCCH). A downlink physical channel is a set of a series of resource elements (REs). RE is the minimum unit of time-frequency resources, that is, in terms of frequency, it is one sub-carrier, while in terms of time, it is one OFDM symbol. The allocation granularity of physical resources is physical resource block (PRB). One PRB contains twelve successive sub-carriers in terms of frequency and corresponds to one time slot in terms of time. Two PRBs within two time slots on a same sub-carrier within one subframe are called a PRB pair. Different REs can be used for different functions, for example, cell-specific reference signal (CRS), user-specific demodulation reference signal (DMRS), and channel state indication-reference signal (CSI-RS). Specifically, in one subframe, there can be at most forty REs used for CSI-RS. The base station can configure some or all of those REs actually for CSI-RS.

Depending upon the number of antennas deployed in the base station, one, two, four or eight ports for CSI-RS can be configured. In order to determine time-frequency resources for CSI-RS resource mapping, it is necessary to indicate the period of CSI-RS, subframe offset and RE in one subframe, wherein CSI-RS subframe configuration is used for indicating the position of a subframe occupied by the CSI-RS, that is, indicating the period $T_{CSI-RS}$ of CSI-TS and subframe offset $\Delta_{CSI-RS}$; and the CSI-RS configuration is used for indicating REs occupied by the CSI-RS in one PRB pair.

In order to further improve the spectrum efficiency, data of a plurality of users can be multiplexed in power domain. Generally, the multiplexed users have different transmission power. In receiving data of such multiplexed users with higher power, signals from users with lower power can be processed by regarding them as noise, and also can be processed by other more advanced methods. In receiving data of such multiplexed users with lower power, data from users with higher power can be received first, and signals from users with higher power are restored and deleted; and then, data from users with lower power can be decoded. Here, data from a plurality of users can be multiplexed in same time, frequency and spatial resources so that users are distinguished merely depending upon different power; or, this time, frequency and spatial multiplexing method can be combined with power domain multiplexing to maximize the performance. How to effectively support multi-user multiplexing based on power domain is a problem to be solved.

DISCLOSURE OF INVENTION

Solution to Problem

The present application provides a method and device for multi-user multiplexing transmission, to effectively support multi-user multiplexing based on power domain.

The present application discloses a method for multi-user multiplexing transmission, for decoding data of a plurality of user equipments (UEs) multiplexed by power domain, including:

acquiring control information for decoding an interfering UE;

decoding received data according to said control information to obtain data of the interfering UE, coding said data to restore a signal of the interfering UE, and deleting the signal of said interfering UE from the received data; and decoding the received data from which the signal of the interfering UE has been deleted, to obtain data of a target UE.

Preferably, multiplexing the plurality of UEs by power domain comprises: multiplexing data of the plurality of UEs in the same time, frequency and spatial resources, and distinguishing users only by different power; or distinguishing users by a combination of different time, frequency, space and power.

Preferably, said control information includes at least one of the following information: modulation and coding scheme (MCS), redundancy version (RV) of hybrid automatic repeat request (HARQ), HARQ process ID, scrambling code information, method for performing resource element (RE) mapping for data transmission of the interfering UE, and operation mode of a UE.

Preferably, in a case where data of the plurality of UEs is multiplexed in the same time, frequency and spatial resources and users are distinguished only by different power, the MCS acquired by a target UE includes:

jointly coding of MCSs of the target UE and the interfering UE, wherein the sum of modulation orders of the target UE and the interfering UE is less than a set threshold; or jointly coding of the MCS of the interfering UE and a power ratio r of signal power of the interfering UE and the target UE.

Preferably, said acquiring control information for decoding the interfering UE includes: acquiring a predefined MCS set or acquiring an MCS set from a high-layer signaling, and acquiring an MCS item used by the current scheduling from a downlink control information (DCI) format.

Preferably, said MCS set acquired from the high-layer signaling is determined according to operation state of a UE;

in a case where data of the plurality of UEs is multiplexed in the same time and frequency resources and in the same or different spatial resources and users are distinguished only by different power, the operation state of a UE includes:

first state: there is no other UE multiplexed in the same time and frequency resources or the interference of other UEs is less than a set first threshold;

second state: there are other UEs multiplexed in the same time and frequency resources and the interference between the UEs is greater than a set second threshold, and the power of said UE is greater than that of other UEs; and third state: there are other UEs multiplexed in the same time and frequency resources and the interference between the UEs is greater than the set second threshold, and the power of said UE is less than that of other UEs.

Preferably, a target UE processes data of an interfering UE on an assumption that the RV of the interfering UE is 0; or a target UE buffers soft bits of an interfering UE and performs HARQ combining reception.

Preferably, a parameter for generating said scrambling code information includes a UE index and/or power information of a UE.

Preferably, a parameter for determining to perform RE mapping on data transmission of an interfering UE includes one or more of the following parameters: a starting orthogonal frequency division multiplexing (OFDM) symbol mapped on a physical downlink shared channel (PDSCH), the total number of demodulation reference signal (DMRS) ports, and the configured non-zero power channel state information-reference signal (NZP CSI-RS) and zero power channel state information-reference signal (ZP CSI-RS).

Preferably, this method further includes: receiving N groups of parameters regarding RE mapping of an interfering UE configured by a high-layer signaling, and receiving a group of parameters of said N groups of parameters regarding RE mapping of the interfering UE dynamically indicated in a DCI format.

Preferably, the operation mode of a UE includes:

when a base station schedules the plurality of UEs in the same time and frequency resources and said plurality of UEs need to be distinguished by different transmission power, the operation mode of said plurality of UEs is Operation Mode 1; and when the base station schedules only one UE in the same time and frequency resources, or, when the base station schedules the plurality of UEs in the same time and frequency resources and said plurality of UEs can receive the respective downlink data without relying on the decoding of interfering UEs, the operation mode of said UE is Operation Mode 2.

Preferably, the operation mode acquired by a target UE includes:

jointly coding of an operation mode and an MCS; or jointly coding of information about an operation mode and information about a power ratio of a UE in the Operation Mode 1; or jointly coding of information about an operation mode and information about the number of layers of an interfering UE in the Operation Mode 1; or for a transmission mode based on Transmission Mode TM10, acquiring indication information of an operation mode in PQI information; or acquiring configuration information of N groups of interfering UEs from a high-layer signaling, the configuration information of said each group of interfering UEs containing indication information of an operation mode of a UE, and acquiring indication information of the configuration information of said N groups of interfering UEs from a DCI of a target UE; or dividing all subframes into N subframe sets, each of said N subframe sets having different interference and said N subframe sets being configured with corresponding operation modes.

The present application further provides a device for multi-user multiplexing transmission, for decoding data of a plurality of UEs multiplexed by power domain, including: a control information acquisition module, an interference signal deletion module and a decoding module, wherein said control information acquisition module is configured to acquire control information for decoding an interfering UE;

said interference signal deletion module is configured to decode received data according to said control information to obtain data of the interfering UE, code said data to restore a signal of the interfering UE, and delete the signal of the interfering UE from the received data; and said decoding module is configured to decode the received data from which the signal of the interfering UE has been deleted, to obtain data of a target UE.

It can be seen from the above technical solutions that, by the method and device for multi-user multiplexing transmission provided by the present application, first, control information for decoding an interfering UE is acquired; the received data is decoded according to said control information to obtain data of the interfering UE, said data is coded to restore a signal of the interfering UE, and the signal of said interfering UE is deleted from the received data; and finally the received data from which the signal of the interfering UE has been deleted is decoded, to obtain data of a target UE. Accordingly, multi-user multiplexing based on power domain is effectively supported.

BRIEF DESCRIPTION OF DRAWINGS

FIG. 1 shows a structure of an LTE FDD frame;

FIG. 2 is a schematic structure diagram of a downlink subframe in an LTE system;

FIG. 3 is a method for processing an MCS according to a preferred embodiment of the present invention;

FIG. 4 is a schematic view of generating a scrambling code according to a preferred embodiment of the present invention;

FIG. 5 is a method for performing RE mapping according to a preferred embodiment of the present invention; and FIG. 6 is a schematic composition structure diagram of a device for multi-user multiplexing transmission according to a preferred embodiment of the present invention.

MODE FOR THE INVENTION

To make the objectives, technical solutions and advantages of the present application clearer, the present application will be further described in detail as below with reference to the accompanying drawings by embodiments.

When it is necessary to multiplex data of a plurality of UEs in the same time-frequency resources for transmission, one of UEs which is receiving data is referred to as a target UE, and other UEs multiplexed in this time-frequency resources are collectively referred to as interfering UEs.

Accordingly, when the target UE is receiving data, one basic processing method is as follows: first, decoding data of the interfering UE to obtain data of the interfering UE; then, coding the data of the interfering UE to restore a signal of the interfering UE, and deleting the signal of the interfering UE from the received signal; and next, decoding data of the target UE. The decoding performance is improved. This method is particularly suitable for a case in which the power of the interfering UE is higher. Here, data from a plurality of users can be multiplexed in the same time, frequency and spatial resources so that users are distinguished merely depending upon different power; or, this time, frequency and spatial multiplexing method can be combined with power domain multiplexing to maximize the performance. In order to support the decoding of the interfering UE, the target UE needs to know a series of control information of the interfering UE. Various parameters which influence the decoding of the interfering UE will be described as below, respectively.

Embodiment 1

According to the above analysis, in order to support the decoding of the interfering UE, the target UE needs to know a series of control information of the interfering UE. This control information can be modulation and coding scheme (MCS). According to the MCS, the transport block size (TBS) of the interfering UE can be obtained.

In a case where data of a plurality of UEs is multiplexed in the same time, frequency and spatial resources and UEs are distinguished only by different power, the modulation symbols of two UEs are superimposed to form a new constellation. The modulation order of the target UE is represented by k1 and the modulation order of the interfering UE is k2. The modulation effect on one time-frequency resource element (RE) is equivalent to a new constellation bearing k1+k2 bits. Due to the error vector magnitude (EVM) of the transmitting and receiving parties, the receiving distortion and other factors, the number of bits which can be borne on one RE is limited. For example, so far, the maximum modulation order supported by LTE is 8, i.e., 256QAM. Accordingly, in a case where data of a plurality of UEs is multiplexed, limitation can be given that the sum of modulation orders of two UEs on one RE must be less than or equal to a certain value k, i.e., k1+k2<k. k can be configured by a high-layer signaling, or k is predefined, for example, k is equal to 8. Based on this limitation, if control information is added in the DCI format of the target UE to indicate the MCS of the interfering UE, the MCS signaling overhead of two UEs can be reduced by jointly coding of MCSs of the target UE and the interfering UE. It is assumed that the target UE performs blind detection on both the DCI which schedules the data transmission of the target UE and the DCI which schedules the data transmission of the interfering UE to obtain the control information of the interfering UE. If one interfering UE multiplexed in the same time-frequency resources, the sum of the modulation order of which and the modulation order of the target UE exceeding the above threshold, is detected, the UE can directly abandon the decoding of data of this interfering UE.

In a case where data of a plurality of UEs is multiplexed in the same time, frequency and spatial resources and UEs are distinguished only by different power, in receiving data of the multiplexed UEs with higher power, signals of UEs with lower power can be processed by regarding them as noise, or can be processed by other more advanced methods. Here, because there is signal of another UE with lower power in the same time, frequency and spatial resources, the signal of this UE with lower power limits the signal-to-noise ratio that a UE with higher power can achieve. For example, a ratio of signal power of a UE with higher power and signal power of a UE with lower power is represented by r. The SNR of the UE with higher power is usually less than or equal to r because there is interference and noise from other cells or this cell. Based on the above analysis, if the target UE is a UE with higher power, control information can be added in the DCI format of the target UE to indicate the MCS of the interfering UE and the power ratio r of the two UEs. In this case, according to the correlation between MCS and r, the overhead of the DCI can be reduced by jointly coding of MCS and r.

When it is needed to multiplex data of a plurality of UEs in the same time and frequency resources, including a case where the spatial resources are the same or different, the MCSs of the plurality of UEs are correlated to each other. For one UE, it can operate in one of the following states:

1) there is no other UE multiplexed in the same time-frequency resources, or those UEs can be ignored (that is, the interference of other UEs is less than a set first threshold);

2) there are other UEs multiplexed in the same time-frequency resources and there is heavy interference between the UEs (that is, the interference between UEs is greater than a set second threshold), and this UE is a UE with higher transmission power; and 3) there are other UEs multiplexed in the same time-frequency resources and there is heavy interference between the UEs (that is, the interference between UEs is greater than the set second threshold), and this UE is a UE with lower transmission power.

Two tables regarding MCS are defined in the LTE standard, one table of which is an MCS table for supporting to distinguish QPSK, 16QAM and 64QAM, represented by MCS Table 1, and the other table is a table for supporting to distinguish QPSK, 16QAM, 64QAM and 256QAM, represented by MCS Table 2. MCS Table 2 is mainly used in a case where the channel condition of a UE is very good, so that the spectrum efficiency can be maximized. A base station can configure a proper MCS table according to the operation state of a UE. When multiplexing a plurality of UEs in the same time-frequency resources is supported, corresponding to those different operation states of a UE, the order of a modulation mode that can be supported by the UE can be different. For example, it may be possible that, for different operation states of a UE, the MCS tables suitable for the UE can be different.

For example, with regard to the state 1), because there is no other UE multiplexed in the same time-frequency resources or the interference of other UEs is slight, it is possible to configure a higher modulation order, for example, MCS Table 2, so as to improve the spectrum efficiency;

for a UE which is in the state 2), since the SNR of this UE is limited depending upon a ratio r of signal power of a UE with higher power and a UE with lower power, it is possible to only configure a lower modulation order, for example, MCS Table 1, so as to support to use the QPSK and 16QAM modulation modes in a finer granularity without changing the bit overhead; and for a UE which is in the state 3), after deleting the interference signals of a UE with higher power, the SNR of this UE depends upon the performance of interference deletion and correspondingly influences the suitable modulation order, for example, correspondingly decides a suitable MCS table.

In order to match the channel condition and the operation state of a UE, the present invention provides a method for processing MCS, as shown in FIG. 3, including: first, configuring an MCS set of a UE by a high-layer signaling according to the operation state of the UE, or predefining an MCS set; and then dynamically indicating an MCS item currently used for scheduling the UE in a DCI format. This MCS set refers to a group of MCS items which can be used for data transmission of the UE in this operation state. Which MCS item in the MCS set will be specifically used relies on the scheduling of a base station. This MCS set can appear in the standard as a separate table. In this case, the above indication of an MCS set actually means indication of an MCS table. Or, in a case that the MCS of the plurality of UEs multiplexed are jointly coded, this MCS set of one UE is a set of available MCS items corresponding to one UE in the jointly coded MCS information. Actually, in a case of joint coding, the MCS sets of the plurality of UEs multiplexed in the same time-frequency resources are configured by a same signaling or simultaneously predefined. Those MCS sets can correspond to two MCS tables in the existing LTE standard, or subsets of said two MCS tables; or, other modulation modes and coding rates can be supported, and the corresponding TBS information is defined accordingly.

For one UE, it is assumed that it can operate in one of the above three states, and the present invention proposes that a MCS set when the UE operates in the above three states can be configured respectively. Accordingly, after a UE is configured to operate in a certain one of those states by a high-layer signaling or a UE is dynamically indicated to operate in a certain one of those states by a physical-layer signaling, for example, a DCI, the UE can process data transmission by using an MCS set corresponding to this state. Here, for one UE, an MCS set of an interfering UE, in a case where there are other UEs multiplexed in the same time-frequency resources and there is heavy interference between the UEs, can be further configured. Here, an MCS set of an interfering UE can be configured only for a case where the interfering UE is a UE with higher power; or, an MCS set of an interfering UE can be configured respectively for a case where the interfering UE is a UE with higher power or a UE with lower power. Accordingly, after determining that a UE operates in a certain one of those states, the UE can determine an MCS set of an interfering UE according to its state. Specifically, if a UE is in the state 1), there is no interfering UE; if the UE is in the state 2), an interfering UE has lower power, and an MCS set of the interfering UE is correspondingly determined; and, if the UE is in the state 3), an interfering UE has higher power, and an MCS set of the interfering UE is correspondingly determined.

Or, for one UE, it is assumed that a UE is configured to operate in, in addition to the state 1), one of the state 2) and the state 3), that is, the UE can operate in one of those two states. The operation mode of a UE can be configured by a high-layer signaling, i.e., state 1) and state 2), or, state 1) and state 3); and then, MCS sets for the two states, in which the UE can operate, can be respectively configured by a high-layer signaling. Accordingly, after a UE is configured to operate in a certain one of those states by a high-layer signaling or a UE is dynamically indicated to operate in a certain one of those states by a physical-layer signaling, for example, a DCI, the UE can process data transmission by using an MCS set corresponding to this state. Here, for one UE, an MCS set of an interfering UE, in a case where there are other UEs multiplexed in the same time-frequency resources and there is heavy interference between the UEs, can be further configured. Here, only one MCS set for an interfering UE can be configured by a high-layer signaling. That is, in a case that a UE can operate in the state 2), an interfering UE has lower power and an MCS set thereof is correspondingly configured; and in a case that a UE can operate in the state 3), an interfering UE has higher power and an MCS set thereof is correspondingly configured.

Or, for those states in which one UE can operate, MCS sets corresponding to some states can be configured, while MCS sets for other states are fixed. For ease of description, an MCS set which does not support a higher modulation order, for example, does not support 256QAM, is referred to as MCS Set 1; and an MCS set which supports a higher modulation order is referred to as MCS Set 2.

One processing method is as follows: corresponding to those three states, when a UE is in the state 1), an MCS set of the UE can be configured by a high-layer signaling; when the UE is in the state 2) or state 3), an MCS set which is fixedly used by the UE can be predefined, for example, MCS Set 1. This is because, when the UE is in the state 2), its SNR is limited by a ratio of signal power of this UE and a UE with lower power; and when the UE is in the state 3), after interference signals of a UE with higher power are deleted, there are still some residual interference signals of the UE with higher power, and as a result, the SNR of the UE will not be very large. In addition, if the total modulation order k of UEs multiplexed in the same time-frequency resources is limited to be less than or equal to 8, when a UE operates in the state 2) or state 3), the UE will certainly not use 256QAM modulation. Therefore, an MCS set which is fixedly used by the UE can be predefined, for example, MCS Set 1. However, when the UE operates in the state 1), an MCS set can be determined according to the configuration signaling of a base station. Here, for one UE, an MCS set of an interfering UE, in a case where there are other UEs multiplexed in the same time-frequency resources and there is heavy interference between the UEs, can be further configured; or an MCS set which is fixedly used by the interfering UE can be predefined, for example, MCS Set 1.

Or, another processing method is as follows: corresponding to above three states, when a UE is in the state 1) and state 3), an MCS set of the UE can be configured by a high-layer signaling; when the UE is in the state 2), an MCS set which is fixedly used by the UE can be predefined, for example, MCS Set 1. This is because, when the UE is in the state 2), its SNR is limited by a ratio of signal power of this UE and a UE with lower power; and when the UE is in the state 3), after interference signals of a UE with higher power are deleted, if the performance of interference deletion is good, the SNR of this UE still can be large, so that it is possible to use a same MCS set as that used when the UE operates in the state 1). Here, for one UE, an MCS set of an interfering UE, in a case where there are other UEs multiplexed in the same time-frequency resources and there is heavy interference between the UEs, can be further configured; or an MCS set which is fixedly used by the interfering UE can be predefined, for example, MCS Set 1.

Embodiment 2

According to the above analysis, in order to support the decoding of the interfering UE, the target UE needs to know a series of control information of the interfering UE. When a plurality of UEs are multiplexed, it is assumed that it is necessary to support an interfering UE to retransmit data.

This control information can be the redundancy version (RV) of HARQ. It is assumed that, when a target UE further needs to combine data of an interfering UE, this control information further includes HARQ process ID.

If a UE does not buffer soft bits of an interfering UE, that is, when errors occur in decoding of the interfering UE, the UE abandons all soft bits of the interfering UE so that the UE performs decoding only according to signals of the interfering UE received by the current subframe. That is, the demodulation mechanism based on HARQ is not used. In this case, it may be unnecessary to indicate the HARQ process ID of the interfering UE. But the RV of the interfering UE still can be indicated. If control information is added in the DCI format of the target UE to indicate the parameter of the interfering UE, the DCI format of the target UE can only contain the RV of the interfering UE, and does not contain the HARQ process ID of the interfering UE. In a case that the target UE performs blind detection on both the DCI which schedules the data transmission of the target UE and the DCI which schedules the data transmission of the interfering UE to obtain the control information of the interfering UE, the UE can directly ignore the HARQ process ID in the DCI format of the interfering UE.

Or, because the decoding performance of RV 0 is usually superior to other RVs, when it is not planned to decode data of the interfering UE based on HARQ, in order to ensure the decoding performance of a UE with lower power to a UE with higher power, it can considered in default that the RV of the interfering UE is definitely 0. With this method, a UE with higher power can be limited to definitely initial transmission when a plurality of UEs are multiplexed in the same time-frequency resources, so that the RV can be set as 0; or, the interfering UE can be not limited to definitely initial transmission, and in order to allow the RV of the interfering UE to be 0, the scheduling of a base station is limited to only use Chase Combining to process the HARQ transmission of the interfering UE. Accordingly, in a case that control information is added in the DCI format of the target UE to indicate the parameter of the interfering UE, the DCI format of the target UE does not need to contain the RV information of the interfering UE. In a case that the target UE performs blind detection on both the DCI which schedules the data transmission of the target UE and the DCI which schedules the data transmission of the interfering UE to obtain the control information of the interfering UE. If one interfering UE multiplexed in the same time-frequency resources, the RV of which in the DCI format is not 0, is detected, the UE can directly abandon the decoding of data of this interfering UE.

If a UE buffers soft bits of an interfering UE, that is, when errors occur in decoding of the interfering UE, the UE buffers at least part of soft bits of the interfering UE, so that data of the interfering UE is received based on HARQ soft combining. In this case, the HARQ process ID of the interfering UE can be indicated, and when the HARQ transmission based on increased redundancy (IR) of data of the interfering UE is supported, the RV also needs to be indicated. Because it is necessary to buffer soft bits of the interfering UE, a corresponding method for buffering soft bits of the interfering UE is required. According to the LTE standard, on the UE side, a UE can equally divide its soft buffer to cells in which the UE is configured by a base station to operate. Then, for each cell, for at least $K_{MIMO} \cdot \min(M_{DL\_HARQ}, M_{limit})$ transport blocks, when one coding block of one transport block fails in decoding, the number of soft bits saved for this coding block is at least $$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right),$$

where $N_{cells}^{DL}$ is the number of cells in which the UE is configured by the base station to operate; $N_{soft}$ is the total number of soft buffer bits of the UE; $K_{MIMO}$ is determined according to a transmission mode (TM) of a cell where the UE performs data transmission; $M_{DL\_HARQ}$ is the maximum number of downlink HARQ processes of a cell where the UE performs data transmission; $M_{limit}$ is a constant, for example, 8; and $K_C$ is a constant related to the capacity category of the UE. One implementation method is as follow: during the implementation of a UE, an additional soft buffer is configured to buffer soft bits of an interfering UE. For example, this additionally allocated soft buffer can be processed by this method as described for an LTE system according to the parameter of the interfering UE. Or, another implementation method is as follows: relying on the implementation of the target UE, instead of adding an additional soft buffer, a soft buffer configured by the target UE is shared by data of the target UE and data of the interfering UE. Or, still another method is as follows: a specific method for processing a soft buffer is defined to share a soft buffer configured by the target UE. For example, according to the downlink transmission modes of the target UE and the interfering UE, $K_{MIMO}$ can be extended as the sum K of the number of CWs of the target UE and the interfering UE, K is 2, 3 or 4. Accordingly, the number of soft bits saved for one coding block of the target UE and the interfering UE is $$n_{SB} = \min\left(N_{cb}, \left\lfloor \frac{N_{soft}}{C \cdot N_{cells}^{DL} \cdot K \cdot \min(M_{DL\_HARQ}, M_{limit})} \right\rfloor\right). \quad \text{Embodiment 3}$$

According to the above analysis, in order to support the decoding of the interfering UE, the target UE needs to know a series of control information of the interfering UE. This control information can be scrambling code information after coding and rate matching of data. According to the LTE standard, a bit sequence of a codeword (CW) q is represented by $b^{(q)}(0), \ldots, b^{(q)}(M_{bit}^{(q)}-1)$, $M_{bit}^{(q)}$ is the total number of bits of CW q; and a scrambled sequence is represented by $\tilde{b}^{(q)}(0), \ldots, \tilde{b}^{(q)}(M_{bit}^{(q)}-1)$, then $\tilde{b}^{(q)}(i) = (b^{(q)}(i) + c^{(q)}(i)) \bmod 2$. In this formula, the scrambling code sequence is a Gold sequence, and its initial value $c_{init}$ is:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where, $n_{RNTI}$ is the ID of a UE, $n_s$ is a time slot number within one frame, $N_{ID}^{cell}$ is the physical cell ID (PCID), and $N_{ID}^{MBSFN}$ is the ID of an MBSFN region.

For a PDSCH, the $n_{RNTI}$ of the interfering UE can be configured to the target UE. However, this leads to large overhead, and particularly when the base station can quickly change the multiplexed interfering UE, the overhead for dynamically indicating the $n_{RNTI}$ is large. Therefore, in a case where a plurality of UEs are multiplexed in the same time-frequency resources and it is necessary to decode the interfering UE, is not suitable to be used for generating a scrambling code. In addition, after $n_{RNTI}$ is removed, the scrambling codes of the plurality of UEs multiplexed in the same time-frequency resources are the same, which is disadvantageous for interference randomization. As shown in FIG. 4, the present invention proposes that, in generating an initial value $c_{init}$ of a Gold sequence, $n_{RNTI}$ is removed and meanwhile other parameters are introduced, so that the scrambling codes of different UEs multiplexed in the same time-frequency resources are different. In FIG. 4, some parameters which can be used for generating a scrambling code are listed, and no limitation is given that only parts of those parameters are used for generating $c_{init}$.

A first method is to allocate a different index k for the plurality of UEs multiplexed in the same time-frequency resources, and use the UE index to generate $c_{init}$. For example, $c_{init}=k\cdot 2^{14}+q\cdot 2^{13}+\lfloor n_s/2\rfloor\cdot 2^9+N_{ID}^{cell}$. For example, in a case where multiplexing two UEs is supported, the UE with higher power and the UE with lower power can be distinguished by 1-bit k information.

A second method is to use power information of different UEs multiplexed in the same time-frequency resources to generate $c_{init}$. Because when a plurality of UEs are multiplexed in the same time-frequency resources, the plurality of UEs can use different power if the spatial domain fails to separate the plurality of UEs very well.

Thus the different power can be used for distinguishing the plurality of UEs. For example, the power of one UE is represented by P, then $c_{init}=P\cdot 2^{14}+q\cdot 2^{13}+\lfloor n_s/2\rfloor\cdot 2^9+N_{ID}^{cell}$.

Or, the above two methods can be combined, that is, $c_{init}$ is generated based on the index k and the power P of different UEs multiplexed in the same time-frequency resources. For example, if only two UEs are multiplexed, the parameter k is one bit, $c_{init}=P\cdot 2^{15}+k\cdot 2^{14}+q\cdot 2^{13}+\lfloor n_s/2\rfloor\cdot 2^9+N_{ID}^{cell}$.

In a case where a plurality of UEs are multiplexed in the same time-frequency resources, if there is heavy interference between the UEs, in order to ensure the performance of channel estimation, the plurality of UEs can share a same DMRS port and a DMRS sequence; or, although the plurality of UEs occupy different DMRS ports, the plurality of DMRS ports are multiplexed onto the same time-frequency resources by a CDM method, and in this case, in order to ensure the orthogonality, the DMRS sequences still need to be the same. Accordingly, both the virtual cell IDs (represented by X) for determining DMRS sequences and the DMRS scrambling code sequence indication information $n_{SCID}$ of the plurality of UEs are the same. X and $n_{SCID}$ are invalid for randomizing the interference between the UEs. However, they are still helpful for randomizing other interferences, for example, interference from other cells. Accordingly, information about X and $n_{sup}$ can be contained when $c_{init}$ is generated. For example, information indicating that $N_{ID}^{cell}$ is replaced with X and $n_{SCID}$ is added. For example, $c_{init}=P\cdot 2^{16}+k\cdot 2^{15}+n_{SCID}\cdot 2^{14}+q\cdot 2^{13}+\lfloor n_s/2\rfloor\cdot 2^9+X$.

Embodiment 4

According to the above analysis, in order to support the decoding of the interfering UE, the target UE needs to know a series of control information of the interfering UE. This control information can indicate a method for performing RE mapping for data transmission of the interfering UE. In an LTE system, there can be many parameters which influence the RE mapping, for example, the starting OFDM symbol of PDSCH mapping, the number of CRS ports, the MBSFN subframe configuration, the total number of DMRS ports, and the configured NZP CSI-RS and ZP CSI-RS, or more. Among those parameters, some parameters, such as the number of CRS ports and the MBSFN subframe configuration, are the same for each UE in a same cell; while other parameters can have different values for different UEs. Accordingly, in order to enable the target UE to know the RE mapping method of the interfering UE, all the above possible different parameters need to be indicated to the target UE, for example, one or more of the starting OFDM symbol of PDSCH mapping, the total number of DMRS ports, and the configured NZP CSI-RS and ZP CSI-RS.

For one UE, in one subframe, relying on the scheduling of the base station, the interfering UE which multiplexes the time-frequency resources with this UE can be different, and correspondingly, the RE mapping method of the interfering UE also can be different.

As shown in FIG. 5, N groups of parameters regarding the RE mapping of the interfering UE can be configured by a high-layer signaling. Those parameters include one or more of the starting OFDM symbol of PDSCH mapping, the total number of DMRS ports, and the configured NZP CSI-RS and ZP CSI-RS of the interfering UE; and for each parameter group, a value of each parameter is configured. For different parameter groups, the value of a same parameter can be different. Furthermore, one of the N groups of parameters is dynamically indicated by the DCI format of the target UE to determine the RE mapping of the interfering UE. For example, ceil[$\log_2$ (N)] bits are added in the DCI format, where N is equal to 4. For each group of parameters, values of the starting OFDM symbol of PDSCH mapping, the total number of DMRS ports, and the configured NZP CSI-RS and ZP CSI-RS of the interfering UE are configured, respectively. This method can be used in a case where the target UE is configured with any one TM; or, this method also can be used only in a case where the target UE is configured with TM10.

Or, for the target UE, those parameters regarding the RE mapping of the interfering UE also can be semi-statically configured, without being dynamically indicated in the DCI format. This method can be used in a case where the target UE is configured with any one TM; or, this method also can be used only in a case where the target UE is configured with TM1-TM9. For example, one ZP CSI-RS resource can be configured by a high-layer signaling, and this ZP CSI-RS resource contains REs of NZP CSI-RS and ZP CSI-RS of the interfering UE which are not used for PDSCH transmission. Another parameter which can be semi-statically configured is the starting OFDM symbol of the PDSCH mapping of the interfering UE.

According to the LTE standard, there can be various methods for determining the starting OFDM symbol of the PDSCH mapping. For example, the starting OFDM symbol can be determined according to the PCFICH; or, for a cell configured as Scell and in a case of cross-carrier scheduling, the starting OFDM symbol is configured by a high-layer signaling; or, in a case where the downlink data is scheduled based on EPDCCH, the starting OFDM symbol is configured by another high-layer signaling. Here, once the EPDCCH is configured, the RE mapping is processed according to the starting OFDM symbol corresponding to the EPDCCH configuration.

In order to determine the starting OFDM symbol of the interfering UE, the target UE can fixedly assume that the starting OFDM symbol of the PDSCH mapping of the interfering UE is the same as that of the target UE. Or, for the target UE, the starting OFDM symbol of the PDSCH mapping of the interfering UE can be configured by a high-layer signaling. Or, the starting OFDM symbol of the interfering UE can be processed by the most conservative method. For example, for an LTE system having more than ten PRBs, the RE mapping is processed on the assumption that the starting OFDM symbol is the fourth OFDM symbol of a subframe. Or, the starting OFDM symbol of the PDSCH mapping of the interfering UE can be obtained according to the PCFICH channel. This PCFICH-based method can be a method by which the starting OFDM symbol is determined in default when there is no other method to configure the starting OFDM symbol of the PDSCH mapping.

Embodiment 5

According to the channel state of a UE currently having service requirements and the scheduling policy of a base station, in some subframes, the base station can schedule a plurality of UEs in the same time-frequency resources and those UEs cannot be well separated by the spatial domain, that is, it is necessary to set different transmission power to distinguish the plurality of UEs, and in this case, a UE needs to know control information of other UEs scheduled in the same time-frequency resources, referred to as Operation Mode 1; and in other subframes, the base station schedules only one UE in the time-frequency resources or the plurality of UEs scheduled in the same time-frequency resources are well distinguished by the spatial domain, and in this case, a UE can receive its downlink data without relying on the decoding of the interfering UE, referred to Operation Mode 2. Because the operation modes of different subframes can be different, correspondingly, the DCI information of a UE needs to contain corresponding information to indicate the operation mode of the UE.

Here, one simple method is to add one bit in the DCI format so as to distinguish the above two operation modes. However, this method is disadvantageous to the reduction of overhead. Therefore, jointly coding of the information about an operation mode and other information can be considered so as to reduce the bit overhead of the DCI format.

A first method is to jointly code the information about an operation mode and the MCS. It is assumed that MCSs of the target UE and the interfering UE are jointly indicated, and that the operation mode and the MCS are indicated by k bits. Specifically, M codewords of the k bits can be used to indicate the Operation Mode 2 and the MCS of the target UE; at least a part of the remaining $2^k$-M codewords can be used to indicate the Operation Mode 1 and jointly indicate the MCSs of the target UE and the interfering UE. For example, in an LTE system, when 256QAM is not supported, there are 29 available MCSs, and M can be set as 29; and when 256QAM is supported, there are 28 available MCSs, and M can be set as 28. Or, if the MCSs of the target UE and the interfering UE respectively correspond to separate domains in the DCI, p bits can be used to indicate the operation mode and the MCS of the interfering UE. One codeword of the p bits is used to indicate the Operation Mode 2, that is, there is no interfering UE or information about an interfering UE is not indicated; and at least a part of the remaining $2^p$-1 codewords is used to indicate the Operation Mode 1 and the MCS of the interfering UE. Here, for a TM supporting two TBs, for each TB, the operation mode of this TB and the MCS information can be respectively indicated by the above method, that is, there can be no interfering UE, the interfering UE transmits only one TB, or the interfering UE transmits two TBs.

A second method is to jointly code information about an operation mode and the information about a power ratio of a UE in the Operation Mode 1. This power ratio is a ratio of power of a plurality of UEs multiplexed in the same time-frequency resources. It is assumed that p bits are used to indicate the operation mode and the power ratio of UEs in the Operation Mode 1. One codeword of the p bits is used to indicate the Operation Mode 2, that is, there is no interfering UE or information about an interfering UE is not indicated; and at least a part of the remaining $2^p$-1 codewords is used to indicate the Operation Mode 1 and the power ratio of UEs in the Operation Mode 1. Here, for a TM supporting two TBs, if it is supported to respectively configure a power ratio, obtained when the Operation Mode 1 is used, for each TB, the operation mode of each TB and the power ratio of UEs in the Operation Mode 1 can be respectively indicated by the above method. Or, for a TM supporting two TBs, if the DCI contains only one power ratio domain and the number of bites is represented by p, one codeword of the p bits is used to indicate the Operation Mode 2, and at least a part of the remaining $2^p$-1 codewords is used to indicate the Operation Mode 1 and the value of the power ratio; the interfering UE transmits two TBs; and said value of the power ratio is applicable to all layers of MIMO. Or, for a TM supporting two TBs, if the DCI contains only one power ratio domain and the number of bites is represented by p, one codeword of the p bits is used to indicate the Operation Mode 2, and at least a part of the remaining $2^p$-1 codewords is used to indicate the Operation Mode 1 and the value of the power ratio; distinguishing is performed on whether the interfering user transmits only TB1, only TB2, or transmits two TBs; and said value of the power ratio is applicable to all layers of MIMO.

A third method is to jointly code the information about an operation mode and the information about the number of layers of the interfering UE in the Operation Mode 1. For example, when the indicated number of layers of the interfering UE is greater than 0, it is indicated that the target UE operates in the Operation Mode 1, otherwise it is indicated that the target UE operates in the Operation Mode 2.

A fourth method is as follows: for a transmission mode based on TM10, the existing PQI information can be extended. Specifically, when the information represented by one PQI of the target UE is configured by a high-layer signaling, indication information of the operation mode of the UE is added. Accordingly, relying on the configuration by a high-layer signaling, a different PQI can correspond to a same or different operation mode.

A fifth method is as follows: according to the method as mentioned in Embodiment 4, it is assumed that N groups of configuration information of the interfering UE are configured by a high-layer signaling and one of the N groups of configuration information of the interfering UE is dynamically indicated in the DCI of the target UE. Then each group of configuration information of the interfering UE can contain indication information of the operation mode of the UE. Accordingly, relying on the configuration by a high-layer signaling, a different group of configuration information of the interfering UE can correspond to a same or different operation mode.

A sixth method is to divide all subframes into N subframe sets, for example, in the eICIC technology of the LTE system, into two subframe sets, and each of the N subframe sets can have different interferences. Therefore, the present invention proposes that, for the N subframe sets, the operation mode of each subframe set is configured respectively. This can be semi-statically configured by a high-layer signaling. Thus, for one subframe, it is unnecessary to indicate the operation mode in the DCI format again.

FIG. 6 is a schematic composition structure diagram of a device for multi-user multiplexing transmission according to a preferred embodiment of the present invention. The device is used for decoding data of a plurality of UEs multiplexed by power domain, including: a control information acquisition module, an interference signal deletion module and a decoding module, wherein said control information acquisition module is configured to acquire control information for decoding an interfering UE;

said interference signal deletion module is configured to decode the received data according to said control information to obtain data of the interfering UE, code said data to restore a signal of the interfering UE, and delete the signal of said interfering UE from the received data; and said decoding module is configured to decode the received data from which the signal of the interfering UE has been deleted, to obtain data of a target UE.

The foregoing descriptions are merely preferred embodiments of the present application and not intended to limit the present application. All modifications, equivalent replacements, improvements or more made without departing from the spirit and principle of the present application shall be regarded as falling into the protection scope of the present application.

The invention claimed is:

1. A method by a terminal, the method comprising:
receiving, from a base station, information of a modulation and coding scheme (MCS) set by a higher layer signaling;
receiving, from the base station, downlink control information (DCI) including information on a presence of an interfering terminal causing interference to the terminal;
identifying the presence of the interfering terminal based on the information on the presence of the interfering terminal; and
receiving, from the base station, data based on the DCI, wherein the information of the MCS set is determined based on an operation state of the terminal.

2. The method of claim 1, wherein the DCI includes at least one of information on a MCS item of the interfering terminal, information on an antenna port of the interfering terminal, and information on a power ratio of the terminal.

3. The method of claim 2, wherein the DCI includes information on a scrambling identity of the terminal, and
wherein the scrambling identity of the terminal corresponds to the antenna port of the interfering terminal.

4. The method of claim 1, further comprising:
decoding the received data based on the DCI to obtain data of the interfering terminal;
deleting the data of the interfering terminal from the received data; and
obtaining data of the terminal from data from which the data of the interfering terminal has been deleted.

5. The method of claim 1, wherein the operation state of the terminal includes at least one of:
a first state with no other terminal multiplexed in the same time and frequency resources or the interference is less than a set first threshold;
a second state with other terminals multiplexed in the same time and frequency resources and the interference is greater than a set second threshold, and a transmission power of the terminal is greater than that of other terminals; and
a third state with other terminals multiplexed in the same time and frequency resources and the interference is greater than the set second threshold, and the transmission power of the terminal is less than that of other terminals.

6. A method by a base station, the method comprising:
transmitting, to a terminal, information of a modulation and coding scheme (MCS) set by a higher layer signaling;
transmitting, to the terminal, downlink control information (DCI) including information on a presence of an interfering terminal causing interference to the terminal; and
transmitting, to the terminal, data based on the DCI, wherein the presence of the interfering terminal is identified by the terminal based on the information on the presence of the interfering terminal, and
wherein the information of the MCS set is determined based on an operation state of the terminal.

7. The method of claim 6, wherein the DCI includes at least one of information on a MCS item of the interfering terminal, information on an antenna port of the interfering terminal, and information on a power ratio of the terminal.

8. The method of claim 7, wherein the DCI includes information on a scrambling identity of the terminal and
wherein the scrambling identity of the terminal corresponds to the antenna port of the interfering terminal.

9. The method of claim 6, wherein the transmitted data is decoded based on the DCI to obtain data of the interfering terminal,
wherein the data of the interfering terminal is deleted from the transmitted data, and
wherein data of the terminal is obtained from data from which the data of the interfering terminal has been deleted.

10. The method of claim 6, wherein the operation state of the terminal includes at least one of:
a first state with no other terminal multiplexed in the same time and frequency resources or the interference is less than a set first threshold;
a second state with other terminals multiplexed in the same time and frequency resources and the interference is greater than a set second threshold, and a transmission power of the terminal is greater than that of other terminals; and
a third state with other terminals multiplexed in the same time and frequency resources and the interference is greater than the set second threshold, and the transmission power of the terminal is less than that of other terminals.

11. A terminal in a wireless communication system, the terminal comprising:
a transceiver; and
a controller operatively coupled with the transceiver and configured to:
control the transceiver to receive, from a base station, information of a modulation and coding scheme (MCS) set by a higher layer signaling,
control the transceiver to receive, from the base station, downlink control information (DCI) including information on a presence of an interfering terminal causing interference to the terminal,
identify the presence of the interfering terminal based on the information on the presence of the interfering terminal, and
control the transceiver to receive, from the base station, data based on the DCI,
wherein the information of the MCS set is determined based on an operation state of the terminal.

12. The terminal of claim 11, wherein the DCI includes at least one of information on a MCS item of the interfering terminal, information on an antenna port of the interfering terminal, and information on a power ratio of the terminal.

13. The terminal of claim 12, wherein the DCI includes information on a scrambling identity of the terminal, and
wherein the scrambling identity of the terminal corresponds to the antenna port of the interfering terminal.

14. The terminal of claim 11, wherein the controller is further configured to:
decode the received data based on the DCI to obtain data of the interfering terminal,
delete the data of the interfering terminal from the received data, and
obtain data of the terminal from data from which the data of the interfering terminal has been deleted.

15. The terminal of claim 11, wherein the operation state of the terminal includes at least one of:
a first state with no other terminal multiplexed in the same time and frequency resources or the interference is less than a set first threshold;
a second state with other terminals multiplexed in the same time and frequency resources and the interference is greater than a set second threshold, and a transmission power of the terminal is greater than that of other terminals; and
a third state with other terminals multiplexed in the same time and frequency resources and the interference is greater than the set second threshold, and the transmission power of the terminal is less than that of other terminals.

16. A base station in a wireless communication system, the base station comprising:
a transceiver; and
a controller operatively coupled with the transceiver and configured to:
control the transceiver to transmit, to a terminal, information of a modulation and coding scheme (MCS) set by a higher layer signaling,
control the transceiver to transmit, to the terminal, downlink control information (DCI) including information on a presence of an interfering terminal causing interference to the terminal, and
control the transceiver to transmit, to the terminal, data based on the DCI,
wherein the presence of the interfering terminal is identified by the terminal based on the information on the presence of the interfering terminal, and
wherein the information of the MCS set is determined based on an operation state of the terminal.

17. The base station of claim 16, wherein the DCI includes at least one of information on a MCS item of the interfering terminal, information on an antenna port of the interfering terminal, and information on a power ratio of the terminal.

18. The base station of claim 17, wherein the DCI includes information on a scrambling identity of the terminal, and
wherein the scrambling identity of the terminal corresponds to the antenna port of the interfering terminal.

19. The base station of claim 16, wherein the transmitted data is decoded based on the DCI to obtain data of the interfering terminal,
wherein the data of the interfering terminal is deleted from the transmitted data, and
wherein data of the terminal is obtained from data from which the data of the interfering terminal has been deleted.

20. The base station of claim 16, wherein the operation state of the terminal includes at least one of:
a first state with no other terminal multiplexed in the same time and frequency resources or the interference is less than a set first threshold;
a second state with other terminals multiplexed in the same time and frequency resources and the interference is greater than a set second threshold, and a transmission power of the terminal is greater than that of other terminals; and
a third state with other terminals multiplexed in the same time and frequency resources and the interference is greater than the set second threshold, and the transmission power of the terminal is less than that of other terminals.

* * * * *